(12) United States Patent
Nakatani (10) Patent No.: US 9,327,885 B2
(45) Date of Patent: May 3, 2016

(54) STOPPER SYSTEM, STOPPER, AND CONTAINER HAVING STOPPER

(71) Applicant: PacPlus Co., Ltd., Osaka (JP)

(72) Inventor: Tomoaki Nakatani, Osaka (JP)

(73) Assignee: PACPLUS CO., LTD., Osaka-Shi, Osaka (JP)

( * ) Notice: Subject to any disclaimer, the term of this patent is extended or adjusted under 35 U.S.C. 154(b) by 0 days.

(21) Appl. No.: 14/576,941

(22) Filed: Dec. 19, 2014

(65) Prior Publication Data

US 2015/0101941 A1 Apr. 16, 2015

Related U.S. Application Data

(63) Continuation of application No. PCT/JP2014/053078, filed on Feb. 10, 2014.

(30) Foreign Application Priority Data

Feb. 12, 2013 (JP) ................. 2013-024479

(51) Int. Cl.
| | |
|---|---|
| *B65D 5/72* | (2006.01) |
| *B65D 51/16* | (2006.01) |
| *B41J 2/175* | (2006.01) |
| *F16K 1/00* | (2006.01) |

(52) U.S. Cl.
CPC ............. *B65D 51/16* (2013.01); *B41J 2/17523* (2013.01); *F16K 1/00* (2013.01)

(58) Field of Classification Search
CPC ......... B65D 51/16; B41J 1/17523; F61K 1/00
USPC ................... 222/501, 544–554, 563, 83, 83.5
See application file for complete search history.

(56) References Cited

U.S. PATENT DOCUMENTS

| | | | | |
|---|---|---|---|---|
| 351,453 | A | * | 10/1886 | Messinger ..................... 251/340 |
| 4,380,310 | A | * | 4/1983 | Schneiter et al. ............. 222/501 |
| RE32,354 | E | * | 2/1987 | Savage ............................ 222/81 |
| 5,273,083 | A | * | 12/1993 | Burrows ......................... 141/18 |

(Continued)

FOREIGN PATENT DOCUMENTS

| | | |
|---|---|---|
| EP | 1386745 A1 | 2/2004 |
| EP | 1676784 A1 | 7/2006 |

(Continued)

OTHER PUBLICATIONS

International Search Report dated May 27, 2014 issued in corresponding PCT/JP2014/053078 application (pp. 1-2).

(Continued)

*Primary Examiner* — Lien Ngo (57) ABSTRACT

A stopper system including a female member having a conduction path extending in an axial direction thereof, which is to be fixed to a fluid inlet/outlet port of a container, a plug detachably engaged with the tip of the female member, a first male member for supplying a fluid into the container, and a second male member for plugging the conduction path of the female member. Fluid is supplied to the container by inserting the first male member into the conduction path of the female member. The female member is plugged by inserting the second male member into the conduction path of the female member. The fluid in the container is discharged to the outside by inserting a fluid discharge pin into the second male member.

11 Claims, 5 Drawing Sheets

(56) References Cited

U.S. PATENT DOCUMENTS

| | | | |
|---|---|---|---|
| 8,419,173 B2* | 4/2013 | Hayashi et al. | 347/85 |
| 2002/0092867 A1* | 7/2002 | Last | 222/153.01 |
| 2004/0021747 A1 | 2/2004 | Thielman et al. | |
| 2006/0144875 A1* | 7/2006 | Etesse | 222/494 |

FOREIGN PATENT DOCUMENTS

| JP | 2002-543006 A | 12/2002 |
|---|---|---|
| JP | 2005-8206 A | 1/2005 |
| JP | 2009-202383 A | 9/2009 |

OTHER PUBLICATIONS

English Abstract and Machine Translation for JP2002-543006, Publication Date: Dec. 17, 2002.

English Abstract and Machine Translation for JP2005-8206, Publication Date: Jan. 13, 2005.

English Abstract and Machine Translation for JP2009-202383, Publication Date: Sep. 10, 2009.

* cited by examiner

STOPPER SYSTEM, STOPPER, AND CONTAINER HAVING STOPPER

CROSS-REFERENCE TO RELATED APPLICATION

This application claims priority to and is a continuation of PCT Application No. PCT/JP2014/053078, filed Feb. 10, 2014, the entire contents of which are incorporated herein by reference.

BACKGROUND OF THE INVENTION

1. Field of the Invention

The present disclosure relates to a stopper system, a stopper, and a container having the stopper for supplying various kinds of fluids such as, chemicals, cosmetics, medicines, detergents, foods, beverages, adhesives, paints, inks, etc., into a container, plugging the container and further discharging the fluid in the container.

2. Description of the Related Art

The following description of related art sets forth the inventors' knowledge of related art and certain problems therein and should not be construed as an admission of knowledge in the prior art.

Conventionally, as a stopper system for supplying various kinds of fluids such as chemicals, cosmetics, medicines, detergents, foods, beverages, adhesives, paints, inks, etc., into a container, plugging the container, and further discharging the fluid in the container, Japanese Unexamined Patent Application Publication No. 2009-202383 (hereinafter referred to as "Patent Document 1") discloses the following stopper system.

The stopper system disclosed in Patent Document 1 is applied mainly to an ink pack in an ink-jet printer, etc., and has a structure provided with a cylindrical member fixed to an ink container and having an ink supply port, and a seal member fitted in the cylindrical member to seal a communication between an inside of the ink container and the outside thereof When discharging the ink in the container, the ink in the ink container is guided to the outside through an ink discharge pin inserted in an ink supply port via the seal member. Also, the seal member is made of an elastic body, and therefore, when the ink discharge pin is inserted in the ink supply port through the seal member, the seal member can tightly come into contact with the ink discharge pin and further a pull-out mark of the ink discharge pin can be prevented from remaining therein.

On the other hand, in supplying ink to the ink container, for example, after supplying ink through the ink supply port of a cylindrical member, when the seal member is fitted in the cylindrical member, there are such problems that entry of air into the container and/or leakage of fluid therefrom occur. Specifically, since the seal member is made of an elastic member having an outer diameter larger than the inner diameter of the cylindrical member, the operation for fitting the seal member in the cylindrical member is extremely troublesome, which readily causes entry of air and/or leakage of the fluid.

For this reason, in practice, it has been performed such that in a state in which the seal member is fitted in the cylindrical member of the ink container in advance, facing the bottom portion of the ink container upward, ink is supplied from an unsealed part of the bottom portion of the ink container, and thereafter the bottom portion is sealed.

However, with such ink supply method, in order to prevent entry of air, fluid has to be filled in a vacuum state. This causes problems that a large-sized device is required, increasing the facility investment, which in turn increases a product cost. In addition, since ink is supplied to the very end of the bottom portion of the ink container, there are problems that the ink overflows when sealing the bottom portion of the ink container or sealing failure occurs when the sealing is failed, causing product defects.

These problems occur not only when supplying ink to the container but also when supplying various kinds of fluids such as, chemicals, cosmetics, medicines, detergents, foods, beverages, adhesives, paints, etc., to the container.

The description herein of advantages and disadvantages of various features, embodiments, methods, and apparatus disclosed in other publications is in no way intended to limit the present invention. For example, certain features of the described embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The disclosed embodiments of the present invention have been developed in view of the above-mentioned and/or other problems in the related art. The disclosed embodiments of the present invention can improve upon existing methods and/or apparatuses.

The present disclosure was made in view of the aforementioned problems, and aims to provide a stopper system, a stopper, and a container having the stopper initially capable of easily and assuredly supplying fluid into a container and plugging the container while preventing air from entering into the container or while preventing fluid from leaking, and secondly capable of easily and assuredly discharging the fluid in the container to the outside while preventing air from entering into the container or while preventing fluid from leaking.

In order to achieve the aforementioned objects, some embodiments of the present disclosure include a female member having a conduction path extending in an axial direction, the female member being configured to be fixed to a fluid inlet/outlet port of a container, a plug detachably engaged with a tip part of the female member, a first male member for supplying fluid to the container, and a second male member for plugging the conduction path of the female member. The first male member has a supply flow path extending in the axial direction, and when the first male member is inserted into an inside of the conduction path from a base end opening of the conduction path of the female member, a tip part of the first male member is engaged with the plug and protrudes from a tip part opening of the female member while maintaining an engagement state of the plug to communicate the supply flow path and the inside of the container so that fluid is capable of being supplied to an inside of the container, and when the first male member is pulled out from the conduction path of the female member, the plug engaged with the tip part of the first male member is re-engaged with the tip part of the female member, and the tip part opening of the conduction path of the female member is plugged. After the first male member was removed from the conduction path of the female member, the conduction path of the female member is plugged by inserting the second male member from the base end opening of the conduction path of the female member and fixing to an inside of the conduction path.

With this, by the first male member, the female member, and the plug, fluid can be supplied to the inside of the container while preventing entry of air and/or leakage of fluid in the container. Further, by the second male member and the female member, the conduction path of the female member can be plugged while preventing entry of air and/or leakage of fluid in the container. Therefore, a large-sized apparatus is not required, reducing the facility investment, which in turn can reduce the product cost.

Further, it is preferable that the second male member has an accommodation part extending in the axial direction, and a seal member is fitted in the accommodation part.

With this, the seal member becomes a separate member, so that the seal member can be made of a material capable of easily being inserted by the fluid discharge pin. Specifically, when the seal member is made of an elastic material, the seal member tightly comes into contact with the fluid discharge pin, which hardly causes a gap and can prevent a pull-out mark of the fluid discharge pin from remaining. This in turn can prevent occurrence of leakage of fluid and/or entry of air at the time of discharging the fluid.

Further, it is preferable that the second male member has a distribution part below the seal member, and an inlet port is formed in a side wall of the distribution part.

With this, when the fluid discharge pin is inserted and penetrates the seal member of the second male member, the fluid suction port of the fluid discharge pin can be positioned in the distribution part. Therefore, after the fluid in the container flows from the inlet port of the second male member to the distribution part, it is easily and assuredly discharged to the outside from the fluid suction port of the fluid discharge pin through the discharge flow passage.

Further, it is preferable that the second male member includes slits extending in the axial direction formed in the side wall of the accommodation part and arranged along the circumference direction.

With this, when the seal member is accommodated in the accommodation part of the second male member, the side wall of the accommodation part of the second male member bends radially outward, so that the seal member can be easily accommodated in the accommodation part of the second male member. Further, when the second male member is inserted into the conduction path of the female member, the side wall of the accommodation part of the second male member bends radially inward to pressurize the seal member. Therefore, the seal member hardly comes off from the female member when inserting and removing the fluid discharge pin. In addition, when the fluid discharge pin is inserted into the seal member, the seal member further tightly comes into contact with the fluid discharge pin, which hardly causes a gap therebetween and can prevent a pull-out mark of the fluid discharge pin from remaining.

It is preferable that the second male member include a protruded part formed on an outer surface of the side wall of the accommodation part.

With this, the side wall of the second male member is pressurized from the inner periphery of the conduction path of the female member radially inward through the protruded part, so that the seal member can be effectively pressurized radially inward.

Further, it is preferable that the second male member includes a partition wall provided at a bottom part of the accommodation part.

With this, deterioration of the seal member in the accommodation part due to contacting to the fluid in the container can be prevented.

Further, it is preferable that the second male member includes an inwardly protruded part protruding inward formed at the base end of the conduction path.

With this, when the seal member is fitted in the accommodation part of the body part, the inwardly protruded part presses the top part of the seal member, so that the seal member is prevented from moving in a vertical direction when inserting and removing the fluid discharge pin.

Further, it is preferable that the second male member is provided with an engaging member to be engaged with the female member when inserting into the conduction path of the female member.

With this, the engaging member of the second male member is engaged with the female member, so that it can prevent the second male member from coming off from the conduction path of the female member.

Further, the stopper system may further include a fluid discharge pin for discharging the fluid in the container to an outside. The fluid discharge pin has a discharge flow passage extending in the axial direction, and a fluid suction port communicating with the discharge flow passage, and the discharge flow passage and the inside of the container are communicated via the fluid suction port by inserting the fluid discharge pin to the second male member so as to penetrate the second male member, and the fluid is discharged from the fluid suction port to the outside through the discharge flow passage.

With this, when the fluid discharge pin is inserted into the second male member, the fluid in the container can be easily and assuredly discharged to the outside.

Further, at this time, it can be configured such that the second male member is engaged with the plug when inserting into the conduction path of the female member, and protrudes from the tip part opening of the female member while maintaining the engagement state of the plug, and the fluid suction port of the fluid discharge pin is positioned between the tip part of the female member and the plug when the second male member is inserted, and the fluid is discharged from the fluid suction port to the outside through the discharge flow passage.

Alternatively, it can be configured such that the second male member is engaged with the plug when inserting into the conduction path of the female member, and the engagement state between the plug and the tip part of the female member is maintained, and the fluid discharge pin penetrates the second male member and the plug when inserting into the second male member, and the fluid in the container is discharged from the fluid suction port of the fluid discharge pin to the outside through the discharge flow passage.

A stopper according to the present disclosure is used in the stopper system, and includes a female member having a conduction path extending in an axial direction, the female member being to be fixed in a fluid inlet/outlet port of a container, a plug detachably engaged with a tip part of the female member, and a second male member for plugging the conduction path of the female member.

Further, the container with a stopper according to the present disclosure is provided with one of the aforementioned stoppers.

Alternatively, it can be configured such that a stopper system for a fluid container includes a female member having a conduction path extending in an axial direction, the female member being configured to be fixed to a fluid inlet/outlet port of the fluid container, a plug configured to be engaged with a tip part of the female member to close a tip part opening of the conduction path in a fluid-tight manner, and a first male member for supplying fluid to the container, the first male member including a supply flow path therein extending in the axial direction and a fluid supply port formed at a tip part and communicated with the supply flow path. The plug includes an engagement piece to be engaged with the tip part of the first male member. The tip part of the first male member is configured to be detachably engaged with the engagement piece of the plug so that when the first male member is inserted into the conduction path, the tip part of the first male member is engaged with the engagement piece and protrudes from the tip part opening of the female member with the tip part of the first male member engaged with the engagement piece to communicate the supply flow path of the first male member and an inside of the container via the fluid supply port, and when the first male member is pulled out from the conduction path of the female member, the plug is re-engaged with the tip part of the female member to close the tip part opening of the conduction path of the female member in a fluid-tight manner.

BRIEF DESCRIPTION OF THE DRAWINGS

The disclosed embodiments of the present invention are shown by way of example, and not limitation, in the accompanying figures.

DETAILED DESCRIPTION

The present disclosure now will be described more fully hereinafter with reference to the accompanying drawings, in which various embodiments are shown. The invention may, however, be embodied in many different forms and should not be construed as limited to the example embodiments set forth herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

In the drawings, the size and relative sizes of components and regions may be exaggerated for clarity. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another, for example as a naming convention. For example, a first device could be termed a second device, and, similarly, a second device could be termed a device without departing from the teachings of the disclosure.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" another element, there are no intervening elements present. Other words used to describe the relationship between elements should be interpreted in a like fashion (e.g., "between" versus "directly between," "adjacent" versus "directly adjacent," etc.).

Embodiments described herein will be described referring to plan views and/or cross-sectional views by way of ideal schematic views. Accordingly, the exemplary views may be modified depending on manufacturing technologies and/or tolerances. Therefore, the disclosed embodiments are not limited to those shown in the views, but include modifications in configuration formed on the basis of manufacturing processes. Therefore, regions exemplified in figures may have schematic properties, and shapes of regions shown in figures may exemplify specific shapes of regions of elements to which aspects of the invention are not limited.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Terms such as "same," "planar," or "coplanar," as used herein when referring to orientation, layout, location, shapes, sizes, amounts, or other measures do not necessarily mean an exactly identical orientation, layout, location, shape, size, amount, or other measure, but are intended to encompass nearly identical orientation, layout, location, shapes, sizes, amounts, or other measures within acceptable variations that may occur, for example, due to manufacturing processes. The term "substantially" may be used herein to reflect this meaning.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

<First Embodiment>

Next, a first embodiment of a stopper system according to the present disclosure will be described with reference to FIG. 1 to FIG. 4.

The stopper system is provided with a female member 1 to be fixed to a fluid inlet/outlet port of a container P such as a pouch, etc., a plug 2 detachably engaged with the tip part of the female member 1, and a first male member 3 for supplying fluid to the inside of the container P. The stopper system may further include a second male member 4 for plugging a conduction path of the female member 1, and a fluid discharge pin 5 for discharging the fluid in the container P to the outside.

The female member 1 is made of synthetic resin and formed into a cylindrical shape, and has a conduction path 11 extending in an axial direction. The conduction path 11 extends from the base end side (upper side in FIG. 1) to the tip part side (downside in FIG. 1) of the female member 1, and both of the base end and the tip end of the female member 1 are opened. The conduction path 11 is formed so that the inner diameter is the same as or slightly smaller than an outer diameter of the first male member 3 and the second male member 4. Therefore, when the first male member 3 or the second male member 4 is inserted into the conduction path 11, it becomes a state that the conduction path 11 of the female member 1 and the side wall of the first male member 3 and the second male member 4 tightly come into contact with each other, which prevents air from entering into the container P or the fluid in the container P from leaking to the outside.

Further, the tip part (end part of the lower side in FIG. 1) of the female member 1 is provided with an annular rib 12 which protrudes radially inward. The annular rib 12 is configured to be engaged with the plug 2 and also engaged with the second male member 4 when the second male member 4 is inserted into the conduction path 11 of the female member 1.

Figure 1:
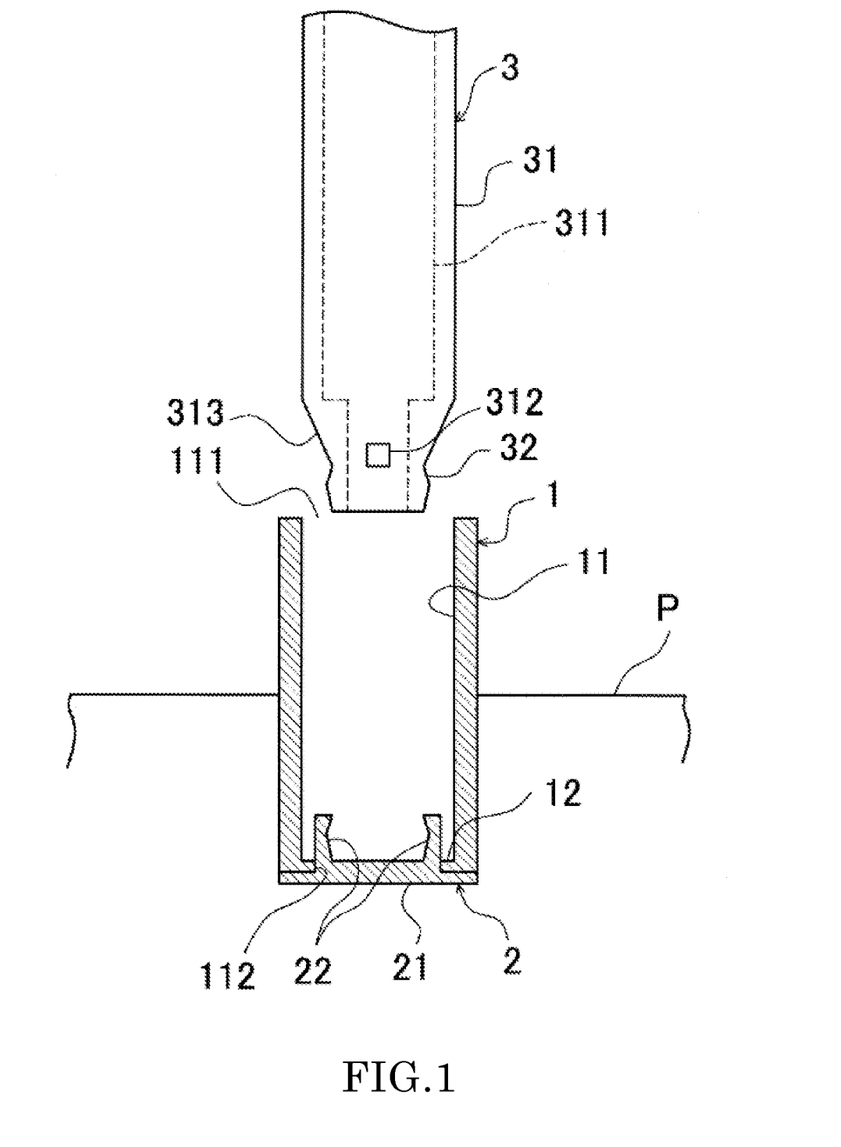
FIG. 1 is a cross-sectional view showing a female member and a first male member in a stopper system according to a first embodiment of the present disclosure.

In general, the female member 1 is fixed to a fluid inlet/outlet port of a container P by mostly welding, etc., but this fixing method is not particularly limited. Also, the entire shape of the female member 1 may be formed into any shapes other than a cylindrical shape.

The plug 2 is provided with a plug main body 21 formed into a disk shape, and an annular-shaped engagement piece 22 provided on the upper surface of the plug main body 21. The outer diameter of the engagement piece 22 is formed to be the same as or slightly larger than the inner diameter of the annular rib 12 of the female member 1. In a state in which the first male member 3 and the second male member 4 are not inserted, the engagement piece 22 is engaged with the annular rib 12 of the tip part of the female member 1 to plug the tip part opening 112. Further, the engagement piece 22 has an inner surface shape corresponding to the shape of the tip part 32 of the first male member 3 and the tip part 43 of the second male member 4. When the first male member 3 or the second male member 4 is inserted into the conduction path 11 of the female member 1, the engagement piece 22 is engaged with the tip part 32 of the first male member 3 or the tip part 43 of the second male member 4.

The first male member 3 is provided with a body part 31 formed into a cylindrical shape, and the tip part 32 provided on the tip side of the body part 31.

The body part 31 of the first male member 3 has a supply flow path 311 therein extending in an axial direction thereof, and a fluid supply port 312 communicating with the supply flow path 311 and opened at the vicinity of the tip part. Therefore, when the first male member 3 is inserted into the conduction path 11 of the female member 1, fluid is supplied to the inside of the container P from the fluid supply port 312 through the supply flow path 311 of the body part 31 of the first male member 3.

Further, in the body part 31 of the first male member 3, the end part thereof on the tip part 32 side is formed into a tapered surface 313 gradually reduced in diameter as approaching the tip part 32 side. Therefore, when the first male member 3 is inserted into the conduction path 11 of the female member 1, the tapered surface 313 of the body part 31 is engaged with the annular rib 12 of the tip part of the female member 1, so that the first male member 3 can be prevented from moving toward the tip part 32 side than a predetermined position.

Figure 2:
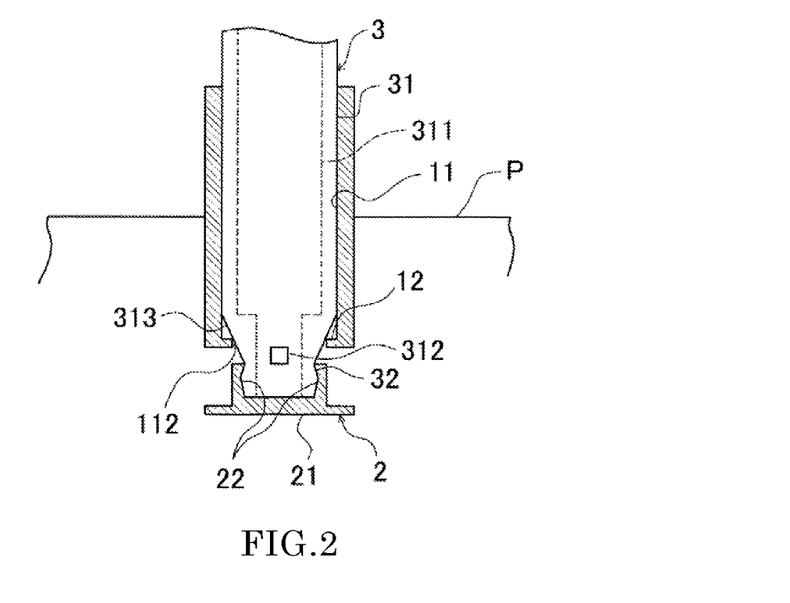
FIG. 2 is a cross-sectional view showing a state in which a first male member is inserted into a female member.

The first male member 3 is formed so that the outer diameter of the tip part 32 is smaller than the inner diameter of the annular rib 12 of the female member 1 and the same as or slightly larger than the engagement piece 22 of the plug 2. Therefore, when the first male member 3 is inserted from the base end opening 111 of the female member 1 into the conduction path 11, the first male member 3 is engaged with the engagement piece 22 of the plug 2 engaged with the tip part of the female member 1, and becomes a state of protruding from the tip part opening 112 of the female member 1 while maintaining the engagement state with the plug 2. On the other hand, when the first male member 3 is pulled out of the conduction path 11 of the female member 1, the plug 2 engaged with the tip part 32 is re-engaged with the annular rib 12 of the tip part of the female member 1, and the tip part opening 112 of the conduction path 11 of the female member 1 is plugged.

Figure 3:
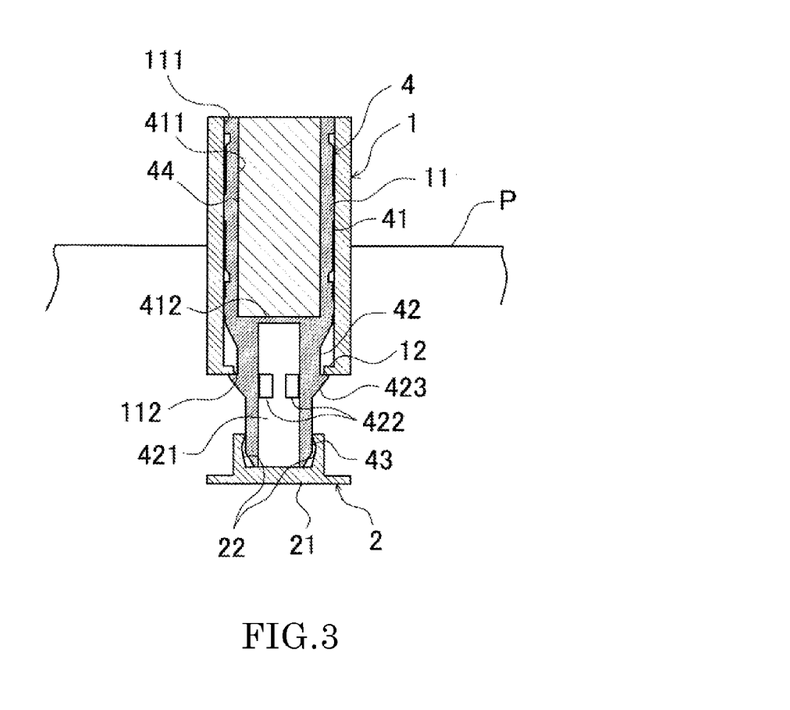
FIG. 3 is a cross-sectional view showing a state in which a second male member is inserted into the female member.

The second male member 4 is provided with a body part 41 formed into a cylindrical shape, a middle part 42 continuously formed at a tip side of the body part 41, and a tip part 43 continuously formed at a tip side of the middle part 42. After pulling out the first male member 3 from the conduction path 11 of the female member 1, the second male member 4 is inserted from the base end opening 111 of the conduction path 11 of the female member 1 into the conduction path 11 of the female member 1 and fixed thereto, to thereby plug the conduction path 11.

The body part 41 of the second male member 4 is provided with an accommodation part 411 extending in the axial direction, and a seal member 44 made of an elastic material is accommodated in the accommodation part 411. The outer diameter of the seal member 44 is formed to be the same as or slightly larger than the inner diameter of the accommodation part 411. Therefore, when the seal member 44 is inserted from the base end opening 111 of the accommodation part 411 and fitted therein, the seal member 44 is fixed by being pressurized by the inner surface of the accommodation part 411.

The seal member 44 is a member separate from the second male member 4, and therefore the second male member 4 can be made of a material such as a synthetic resin, etc., capable of easily inserting into the conduction path 11 of the female member 1. Further, the seal member 44 can be made of an elastic material, etc., capable of being easily inserted by the fluid discharge pin 5. Specifically, in the present embodiment, since the seal member 44 is constituted by an elastic material, the seal member 44 tightly comes into contact with the fluid discharge pin 5. This hardly causes a gap therebetween and can prevent a pull-out mark of the fluid discharge pin 5 from remaining. This in turn can prevent leakage of fluid and/or entry of air at the time of discharging the fluid.

A partition wall 412 is formed at the bottom part of the accommodation part 411. Therefore, the deterioration of the seal member 44 in the accommodation part 411 by contacting to the fluid in the container P can be prevented. Further, the partition wall 412 is thinly formed so that the fluid discharge pin 5 easily penetrates.

The middle part 42 of the second male member 4 is provided with a distribution part 421 therein extending in the axial direction, and inlet ports 422 are formed in the side wall. Therefore, when the second male member 4 is inserted into the conduction path 11 of the female member 1, it becomes a state in which the distribution part 421 and the inside of the container P are communicated via the inlet ports 422.

Further, the middle part 42 of the second male member 4 is provided with an engaging member 423 on the outer periphery of the side wall. The engaging member 423 is formed along the circumferential direction of the side wall of the middle part 42, and formed into a tapered shape of an inverted triangular cross-section reduced in diameter toward the tip part side. Therefore, when the second male member 4 is inserted into the conduction path 11 of the female member 1, the engaging member 423 of the middle part 42 comes into contact with the annular rib 12 of the female member 1. However, when the second male member 4 is further inserted into the conduction path 11 of the female member 1 against the annular rib 12, the engaging member 423 of the middle part 42 runs on and passes through the annular rib 12 of the female member 1. Therefore, the engaging member 423 of the middle part 42 is engaged with the tip surface of the annular rib 12 of the female member 1 in a state of being immovable in the direction toward the base end, which can prevent the second male member 4 from coming off from the conduction path 11 of the female member 1.

The tip part 43 of the second male member 4 is provided with a distribution part 421 therein common to the distribution part of the middle part 42, and the tip surface of the tip part 43 is opened. The tip part 43 of the second male member 4 is formed so that the outer diameter is the same as or slightly larger than the diameter of the engagement piece 22 of the plug 2. Therefore, when the second male member 4 is inserted into the conduction path 11 from the base end opening 111, the second male member 4 is engaged with the engagement piece 22 of the plug 2 engaged with the tip part of the female member 1, and becomes a state of protruding from the tip part opening 112 of the female member 1 while maintaining the engagement state of the plug 2.

Figure 4:
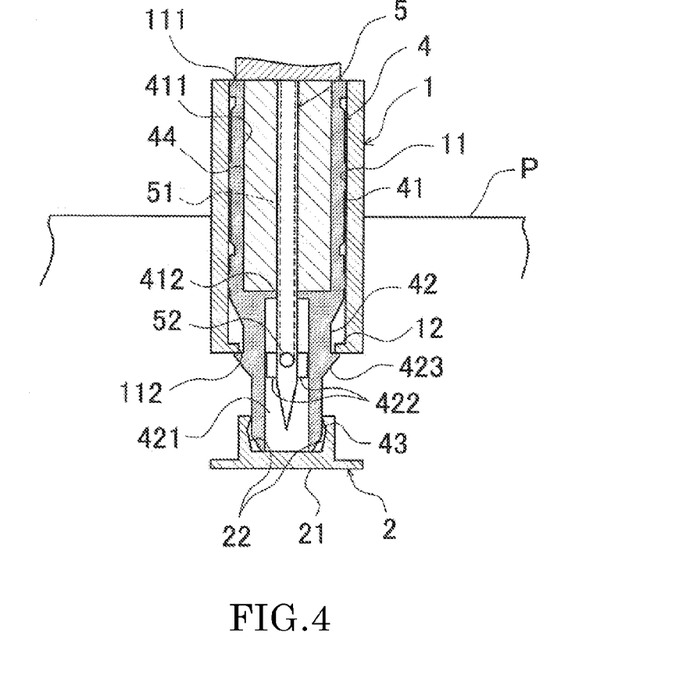
FIG. 4 is a cross-sectional view showing a state in which a fluid discharge pin is inserted into the second male member inserted into the female member.

The fluid discharge pin 5 is made of a metal small tube, and includes a discharge flow passage 51 therein extending in the axial direction, and a fluid suction port 52 is formed in the tip part. Therefore, when the fluid discharge pin 5 is inserted into the seal member 44 of the second male member 4, the fluid discharge pin 5 penetrates the seal member 44 and the partition wall 412, and the fluid suction port 52 of the tip part is positioned between the tip part of the female member 1 and the plug 2, i.e., positioned in the distribution part 421 of the second male member 4. Therefore, the discharge flow passage 51 of the fluid discharge pin 5 and the inside of the container P are communicated through the fluid suction port 52, so that the fluid in the container P is discharged to the outside via the fluid suction port 52 of the fluid discharge pin 5 through the discharge flow passage 51.

Next, a method for supplying fluid to the inside of the container P in this stopper system will be described.

As shown in FIG. 1, in the initial state, the plug 2 is engaged with the tip part of the female member 1 to close the tip part opening 112 of the female member 1.

In this state, when the first male member 3 is inserted into the conduction path 11 of the female member 1, as shown in FIG. 2, the tip part of the first male member 3 is engaged with the engagement piece 22 of the plug 2 engaged with the tip part of the female member 1, and becomes a state of protruding from the tip part opening 112 of the female member 1 while maintaining the engagement state of the plug 2.

At this time, the tapered surface 313 of the body part 31 of the first male member 3 is engaged with the annular rib 12 of the tip part of the female member 1, and becomes a state in which the first male member 3 does not move toward the tip part side thereof from the predetermined position.

Fluid is supplied from the fluid supply port 312 to the inside of the container P through the supply flow path 311 of the body part 31 of the first male member 3.

After supplying fluid to the inside of the container P, the first male member 3 is pulled out from the conduction path 11 of the female member 1. At this time, as shown in FIG. 1, the plug 2 engaged with the tip part 32 is re-engaged with the annular rib 12 of the tip part of the female member 1, and the tip part opening 112 of the conduction path 11 of the female member 1 is closed. Thus, the fluid supply is completed.

Therefore, at the time of supplying the fluid, the fluid can be supplied to the inside of the container P while preventing leakage of fluid and/or entry of air. Before supplying the fluid, the air inside the container P may be suctioned and deaerated by a nozzle having the same shape as that of the first male member 3.

Next, a method for plugging the container P in this stopper system will be described.

First, a seal member 44 is inserted into the accommodation part 411 of the second male member 4 and fixed thereto in advance.

When the second male member 4 is inserted into the conduction path 11 from the base end opening 111 of the female member 1, as shown in FIG. 3, the tip part 43 of the second male member 4 is engaged with the engagement piece 22 of the plug 2 engaged with the tip part of the female member 1, and becomes a state of protruding from the tip part opening 112 of the female member 1 while maintaining the engagement state of the plug 2.

At this time, the engaging member 423 of the middle part 42 of the second male member 4 gradually runs on and passes through the annular rib 12 of the female member 1 along the tapered surface. Therefore, the engaging member 423 is engaged with the tip surface of the annular rib 12 of the female member 1 in a state of being immovable in the direction toward the base end. As a result, it becomes a state in which the second male member 4 cannot come off from the conduction path 11 of the female member 1.

Therefore, at the time of plugging the container P, the conduction path 11 of the female member 1 can be plugged while leakage of fluid and/or entry of air are prevented by the second male member 4.

Next, a method for discharging the fluid from the container P in this stopper system will be described.

When the fluid discharge pin 5 is inserted into the seal member 44 of the second male member 4, as shown in FIG. 4, the fluid discharge pin 5 penetrates the seal member 44 and the partition wall 412, and the fluid suction port 52 is positioned between the tip part of the female member 1 and the plug 2, i.e., positioned in the distribution part 421 of the second male member 4. At this time, the side wall of the accommodation part 411 of the second male member 4 is pressurized from the inner surface of the conduction path 11 of the female member 1. Accordingly, the seal member 44 is pressurized from the inner surface of the accommodation part 411, resulting in a close contact of the seal member 44 to the fluid discharge pin 5, which hardly causes a gap therebetween.

The discharge flow passage 51 of the fluid discharge pin and the inside of the container P are communicated via the fluid suction port 52, so that the fluid in the container P is discharged to the outside via the fluid suction port 52 of the fluid discharge pin 5 through the discharge flow passage 51.

After discharging the fluid in the container P, the fluid discharge pin 5 is pulled out from the seal member 44 of the second male member 4. At this time, the side wall of the accommodation part 411 of the second male member 4 is pressurized from the inner surface of the conduction path 11 of the female member 1. Accordingly, the seal member 44 is pressurized from the inner surface of the accommodation part 411, and therefore a pull-out mark is sealed after pulling out the fluid discharge pin 5.

As explained above, at the time of discharging the fluid, the seal member 44 tightly comes into contact with the fluid discharge pin 5, which hardly causes a gap therebetween and further prevents a pull-out mark from remaining. As a result, the fluid can be discharged while preventing leakage of fluid and/or entry of air.

By using each of the female member 1, the plug 2, the first male member 3, the second male member 4, and the fluid discharge pin 5, the series of actions of supplying the fluid, plugging the container P, and discharging the fluid can be easily and assuredly performed while preventing leakage of fluid and/or entry of air. Therefore, a large-sized apparatus is not required, reducing the facility investment, which in turn can reduce the product cost.

<Second Embodiment>

Next, a second embodiment of the stopper system according to the present disclosure will be described with reference to FIG. 5 and FIG. 6. Hereinafter, the structures different from those of the aforementioned embodiment will be only described, and the descriptions for the same structures will be omitted and the same reference numerals are allotted to the same structures.

This stopper system is provided with a female member 1 which is to be fixed to a fluid inlet/outlet port of a container P, a plug 2 detachably engaged with a tip part of the female member 1, a first male member 3 for supplying fluid to the inside of the container P, a second male member 4 for plugging a conduction path 11 of the female member 1, and a fluid discharge pin 5 for discharging the fluid in the container P to the outside. The female member 1, the plug 2, and the first male member 3 are the same in function and shape as the first embodiment.

The second male member 4 is provided with a body part 41 formed into a cylindrical shape, a middle part 42 continuously formed at the tip side of the body part, and a tip part 43 continuously formed at the tip side of the middle part 42. After the first male member 3 is pulled out from the conduction path 11 of the female member 1, the second male member 4 is inserted into the conduction path 11 from the base end opening 111 of the conduction path 11 of the female member 1 and fixed thereto. This plugs the conduction path 11 of the female member 1.

The body part 41 of the second male member 4 is provided with an accommodation part 411 extending in the axial direction thereof, and a seal member 44 made of an elastic material is accommodated in the accommodation part 411. Further, the body part 41 of the second male member 4 has a radially outwardly protruded flange 413 at the base end. When the body part 41 is inserted into the conduction path 11 of the female member 1, the flange 413 is engaged with the base end of the female member 1, which prevents the movement of the body part toward the tip side from a predetermined position. In this embodiment, since it is structured such that the seal member 44 does not come into contact with the fluid in the container P, no partition wall is formed at the bottom part of the accommodation part 411.

The middle part 42 of the second male member 4 is provided with a distribution part 421 therein extending in the axial direction. In this embodiment, since the fluid discharge pin 5 supplies fluid by penetrating the plug 2 as described later, no inlet port is formed in the side wall of the middle part 42 of the second male member 4.

The tip part 43 of the second male member 4 is provided with a distribution part 421 therein common to the distribution part of the middle part 42, and the tip surface is opened. The tip part 43 of the second male member 4 is formed so that the outer diameter is the same as or slightly larger than the diameter of the engagement piece 22 of the plug 2. Therefore, when the second male member 4 is inserted into the conduction path 11 from the base end opening 111 of the female member 1, the tip part 43 is engaged with the engagement piece 22 of the plug 2 engaged with the tip part of the female member 1. In this embodiment, the fluid is supplied with the the fluid discharge pin 5 penetrating the plug 2, which will be described later, and therefore the engagement state between the plug 2 and the tip part of the female member 1 is maintained, which does not cause a state in which the second male member 4 protrudes from the tip part opening 112 of the female member 1.

The fluid discharge pin 5 is made of a metal small tube, and is provided with a discharge flow passage 51 therein extending in the axial direction, and the fluid suction port 52 is formed in the tip part. Therefore, when the fluid discharge pin 5 is inserted into the seal member 44 of the second male member 4, it penetrates the seal member 44 and the plug 2 and is positioned below the plug 2. Thus, the discharge flow passage 51 of the fluid discharge pin 5 and the inside of the container P are communicated via the fluid suction port 52, and therefore the fluid in the container P is discharged to the outside via the fluid suction port 52 of the fluid discharge pin 5 through the discharge flow passage 51.

Next, a method for plugging the container P in this stopper system will be described. A method for supplying fluid in this stopper system is the same as that of the first embodiment, and therefore the description is omitted.

Initially, the seal member 44 is inserted into the accommodation part 411 of the second male member 4 and fixed therein in advance.

Figure 5:
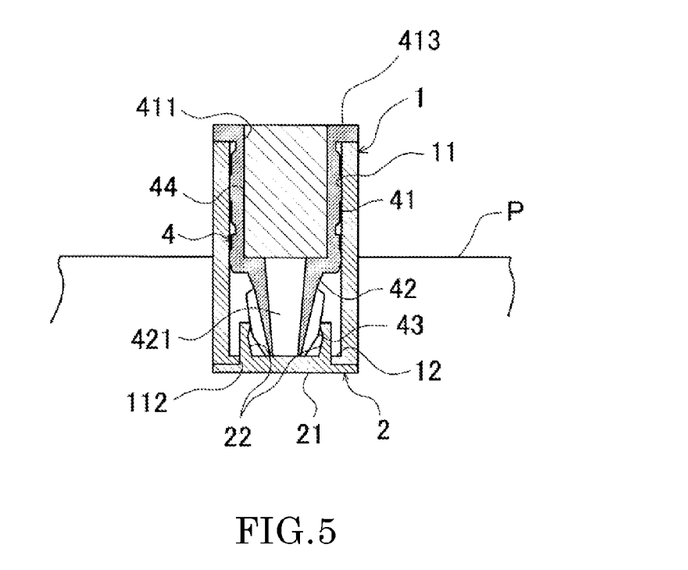
FIG. 5 is a cross-sectional view showing a state in which a second male member is inserted into a female member in a stopper system according to a second embodiment of the present disclosure.

When the second male member 4 is inserted into the conduction path 11 from the base end opening 111 of the female member 1, as shown in FIG. 5, the tip part 43 of the second male member 4 is engaged with the engagement piece 22 of the plug 2 engaged with the tip part of the female member 1. At this time, the flange 413 of the base end is engaged with the base end of the female member 1, so that the second male member 4 does not move toward the tip side from the predetermined position. Therefore, the second male member 4 does not become a state in which the tip part of the second male member 4 protrudes from the tip part opening 112 of the female member 1, and the tip part of the second male member 4 stays near the tip part opening 112 of the female member 1. Therefore, the plug 2 maintains the engagement state of the tip part of the female member 1.

As explained above, at the time of plugging the container P, the conduction path 11 of the female member 1 can be plugged while preventing leakage of fluid and/or entry of air by the second male member 4.

Next, a method for discharging the fluid from the container P in this stopper system will be described.

Figure 6:
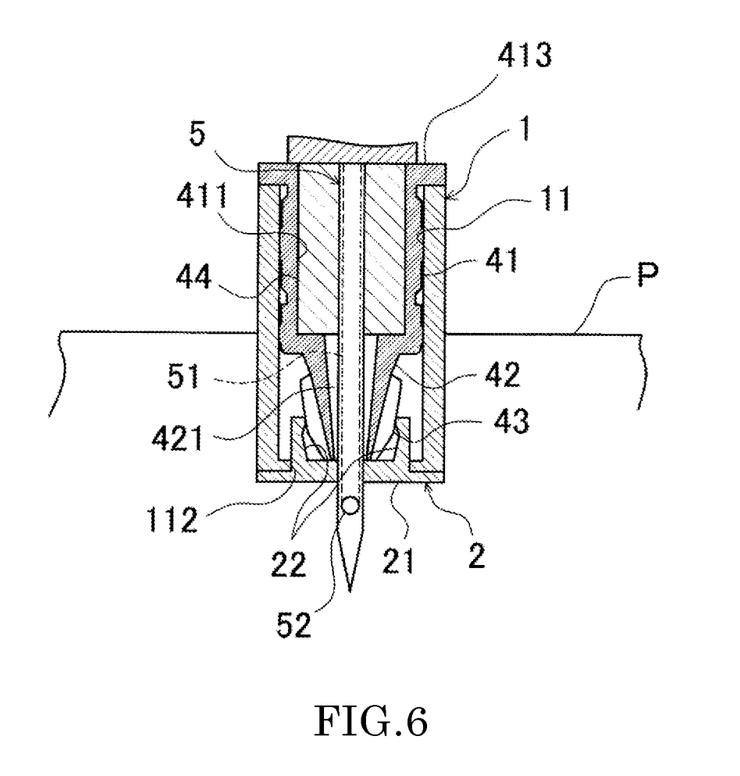
FIG. 6 is a cross-sectional view showing a state in which a fluid discharge pin is inserted into the second male member inserted into the female member.

When the fluid discharge pin 5 is inserted into the seal member 44 of the second male member 4, as shown in FIG. 6, and the fluid discharge pin 5 penetrates the seal member 44 and the plug 2, and the fluid suction port 52 of the tip part is positioned below the female member 1.

The discharge flow passage 51 of the fluid discharge pin and the inside of the container P are communicated via the fluid suction port 52, and therefore the fluid in the container P is discharged to the outside from the fluid suction port 52 of the fluid discharge pin 5 through the discharge flow passage 51.

After discharging the fluid in the container P, the fluid discharge pin 5 is pulled out from the seal member 44 of the second male member 4.

Therefore, at the time of discharging the fluid, the seal member 44 tightly comes into contact with the fluid discharge pin 5, which hardly causes a gap therebetween and prevents a pull-out mark of the fluid discharge pin 5 from remaining. As a result, the fluid can be discharged while preventing leakage of fluid and/or entry of air.

<Third Embodiment>

Figure 7:
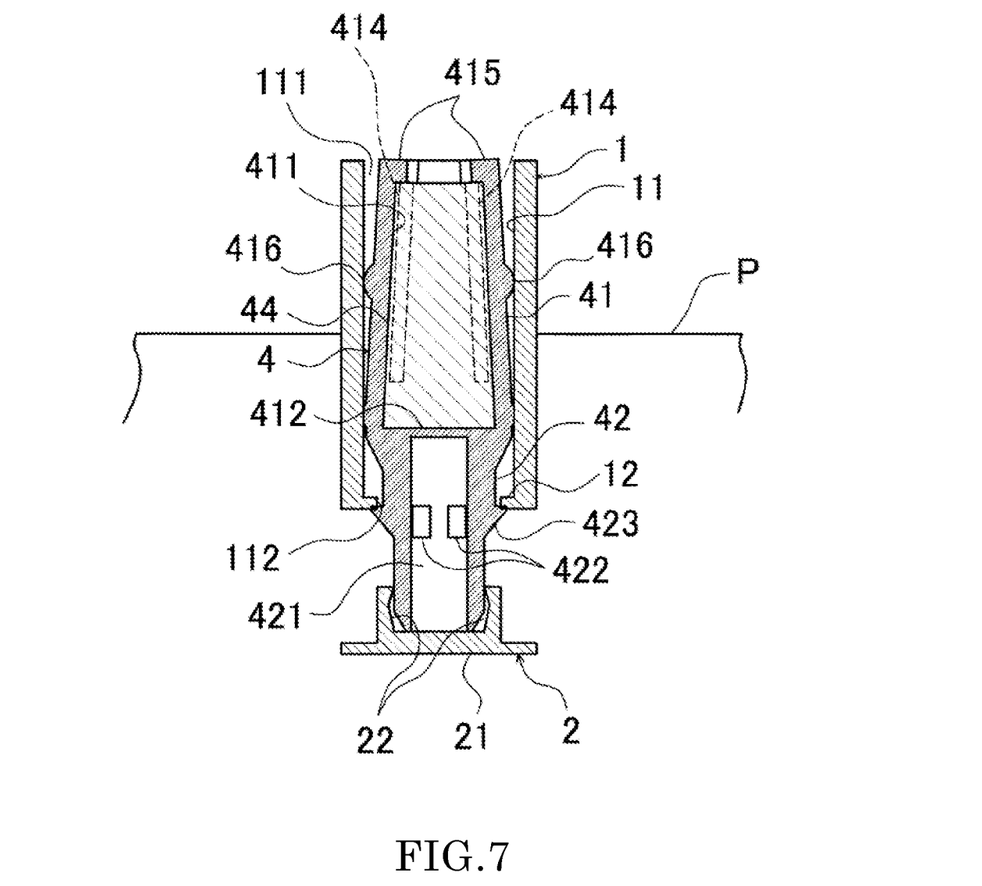
FIG. 7 is a cross-sectional view showing a state in which a second male member is inserted into a female member in a stopper system according to a third embodiment of the present disclosure.

Next, a third embodiment of the stopper system according to the present disclosure will be described with reference to FIG. 7. Hereinafter, the structures different from those of the aforementioned embodiments will be only described, and the descriptions for the same structures will be omitted. The same reference numerals will be allotted to the same structures.

In this embodiment, in the body part 41 of the second male member 4, the side wall is formed into a tapered shape which gradually reduces in diameter toward the base end side, and slits 414 each extending in the axial direction are formed in the side wall of the accommodation part 411 and arranged along the circumference direction. Therefore, when the seal member 44 is accommodated in the accommodation part 411 of the second male member 4, the side wall of the accommodation part 411 of the second male member 4 bends radially outward, so that the seal member 44 is easily accommodated in the accommodation part 411 of the second male member 4. Further, when the second male member 4 is inserted into the conduction path 11 of the female member 1, the side wall of the accommodation part 411 of the second male member 4 bends radially inward to pressurize the seal member 44. Therefore, the seal member 44 hardly comes off from the female member 1 when inserting and removing the fluid discharge pin 5. In addition, when the fluid discharge pin 5 is inserted into the seal member 44, the seal member 44 further tightly comes into contact with the fluid discharge pin 5, which hardly causes a gap therebetween and further prevents a pull-out mark from remaining when the fluid discharge pin 5 is pulled out.

Further, in the body part of the second male member 4, an inwardly protruded part 415 which inwardly protrudes is formed at the base end of the conduction path along the circumference direction. When the seal member 44 is fitted in the accommodation part 411 of the body part 41, the inwardly protruded part 415 presses the top part of the seal member 44, so that the seal member 44 is prevented from being moved in a vertical direction when inserting and removing the fluid discharge pin 5.

Further, in the body part 41 of the second male member 4, a protruded part 416 is formed on the outer surface of the side wall of the accommodation part 411. Therefore, when the second male member 4 is inserted into the conduction path 11 of the female member 1, the contact area between the side wall of the second male member 4 and the inner wall of the conduction path 11 of the female member 1 becomes smaller to reduce the friction therebetween, so that the second male member 4 can be easily inserted into the conduction path 11 of the female member 1. Further, the side wall of the second male member 4 is pressurized radially inward from the inner surface of the conduction path 11 of the female member 1 via the protruded part 416, so that the seal member 44 can be effectively pressurized radially inward.

The aforementioned embodiments of the present disclosure were described with reference to the drawings, but the present invention is not limited to the illustrated embodiments. Various adjustments and/or modifications may be made to the illustrated embodiments within the scope the same as or equivalent to that of the present invention.

While the disclosure has been described with reference to example embodiments, it will be apparent to those skilled in the art that various changes and modifications may be made without departing from the spirit and scope of the disclosed embodiments. Therefore, it should be understood that the above embodiments are not limiting, but illustrative, and the scope of the invention is to be determined by the broadest permissible interpretation of the following claims and their equivalents, and shall not be restricted or limited by the foregoing description.

The invention claimed is:

1. A stopper system comprising:
   a female member having a conduction path extending in an axial direction, the female member being configured to be fixed to a fluid inlet/outlet port of a container;
   a plug detachably engaged with a tip part of the female member;
   a first male member for supplying fluid to the container;
   a second male member for plugging the conduction path of the female member; and
   a fluid discharge pin for discharging the fluid in the container to an outside,
   wherein the first male member has a supply flow path extending in the axial direction,
   when the first male member is inserted into an inside of the conduction path from a base end opening of the conduction path of the female member, a tip part of the first male member is engaged with the plug and protrudes from a tip part opening of the female member while maintaining an engagement state of the plug to communicate the supply flow path and the inside of the container so that fluid is capable of being supplied to the inside of the container, and
   when the first male member is pulled out from the conduction path of the female member, the plug engaged with the tip part of the first male member is re-engaged with the tip part of the female member, and the tip part opening of the conduction path of the female member is plugged,
   wherein after the first male member was removed from the conduction path of the female member, the conduction path of the female member is plugged by inserting the second male member from the base end opening of the conduction path of the female member and fixing to the inside of the conduction path, and
   wherein the fluid discharge pin has a discharge flow passage extending in an axial direction thereof, and a fluid suction port communicating with the discharge flow passage, and the discharge flow passage and the inside of the container are communicated through the fluid suction port by inserting the fluid discharge pin into the second male member so as to penetrate the second male member, and the fluid is discharged from the fluid suction port to the outside through the discharge flow passage.

2. The stopper system as recited in claim 1, wherein the second male member has an accommodation part extending in the axial direction, and a seal member is engaged with the accommodation part.

3. The stopper system as recited in claim 2, wherein the second male member has a distribution part below the seal member, and an inlet port is formed in a side wall of the distribution part.

4. The stopper system as recited in claim 2, wherein the second male member includes slits extending in the axial direction formed in a side wall of the accommodation part and arranged along a circumference direction thereof.

5. The stopper system as recited in claim 2, wherein the second male member includes a protruded part formed on an outer surface of the side wall of the accommodation part.

6. The stopper system as recited in claim 2, wherein the second male member includes a partition wall provided at a bottom part of the accommodation part.

7. The stopper system as recited in claim 2, wherein the second male member includes an inwardly protruded part protruding inward formed at a base end of the conduction path.

8. The stopper system as recited in claim 2, wherein the second male member is provided with an engaging member to be engaged with the female member when inserting into the conduction path of the female member.

9. The stopper system as recited in claim 1,
wherein the second male member is engaged with the plug when inserting into the conduction path of the female member, and protrudes from the tip part opening of the female member while maintaining the engagement state of the plug, and
wherein the fluid suction port of the fluid discharge pin is positioned between the tip part of the female member and the plug when the second male member is inserted, and the fluid is discharged from the fluid suction port to the outside through the discharge flow passage.

10. The stopper system as recited in claim 2,
wherein the second male member is engaged with the plug when inserting into the inside of the conduction path of the female member, and the engagement state between the plug and the tip part of the female member is maintained, and
wherein the fluid discharge pin penetrates the second male member and the plug when inserting into the second male member, and the fluid in the container is discharged from the fluid suction port of the fluid discharge pin to the outside through the discharge flow passage.

11. A stopper system for a fluid container, comprising:
a female member having a conduction path extending in an axial direction, the female member being configured to be fixed to a fluid inlet/outlet port of the fluid container;
a plug configured to be detachably fitted in a tip part opening of the conduction path of the female member to plug the conduction path in a fluid-tight manner;
a first male member for supplying fluid to the container, the first male member including a supply flow path therein extending in the axial direction and a fluid supply port formed at a tip part and communicated with the supply flow path;
a second male member for plugging the conduction path of the female member; and
a fluid discharge pin for discharging the fluid in the container to an outside,
wherein the plug includes an engagement piece to be detachably fitted in the tip part opening of the conduction path of the female member, and
wherein the tip part of the first male member is configured to be detachably engaged with the engagement piece of the plug so that
when the first male member is inserted into the conduction path of the female member, the tip part of the first male member is engaged with the engagement piece and protrudes from the tip part of the female member with the tip part of the first male member engaged with the engagement piece of the plug to communicate the supply flow path of the first male member and an inside of the container via the fluid supply port, and
when the first male member is pulled out from the conduction path of the female member, the engagement piece of the plug is re-fitted in the tip part opening of the female member to plug the conduction path of the female member in a fluid-tight manner,
wherein the second male member includes an accommodation part therein extending in an axial direction thereof, and a seal member fitted in the accommodation part,
wherein after pulling out the first male member from the female member, the second male member is configured to be inserted in the conduction path of the female member to plug the conduction path in a fluid-tight manner,
wherein the fluid discharge pin has a discharge flow passage therein extending in an axial direction thereof, and a fluid suction port communicating with the discharge flow passage, and
wherein the discharge flow passage and the inside of the container are communicated through the fluid suction port when the fluid discharge pin is inserted into the second male member so as to penetrate the seal member.

* * * * *